W. B. SMITH.
Grain Winnower.

No. 92,385.

Patented July 6, 1869.

Witnesses

Inventor

United States Patent Office.

WILLIAM B. SMITH, OF CLAYTON, ILLINOIS, ASSIGNOR TO HIMSELF, REID WALLACE, AND CYRUS FINLEY, OF SAME PLACE.

Letters Patent No. 92,385, dated July 6, 1869.

IMPROVEMENT IN GRAIN-CLEANERS.

The Schedule referred to in these Letters Patent and making part of the same.

*To all whom it may concern:*

Be it known that I, WILLIAM B. SMITH, of Clayton, in the county of Adams, and State of Illinois, have invented a new and improved Grain-Cleaner; and I do hereby declare that the following is a full, clear, and exact description thereof, which will enable others skilled in the art to make and use the same, reference being had to the accompanying drawings, forming part of this specification.

This invention relates to improvements in grain-cleaning machinery, designed to combine a fanning and scouring-apparatus in one machine; and It consists in the arrangement of the blowers, screens, and scouring-apparatus relatively to each other.

Also, in the arrangement of the air-passages for distributing the air upon the screen, and for action upon the grain after leaving the screens, all as hereinafter more fully specified.

Figure 1:
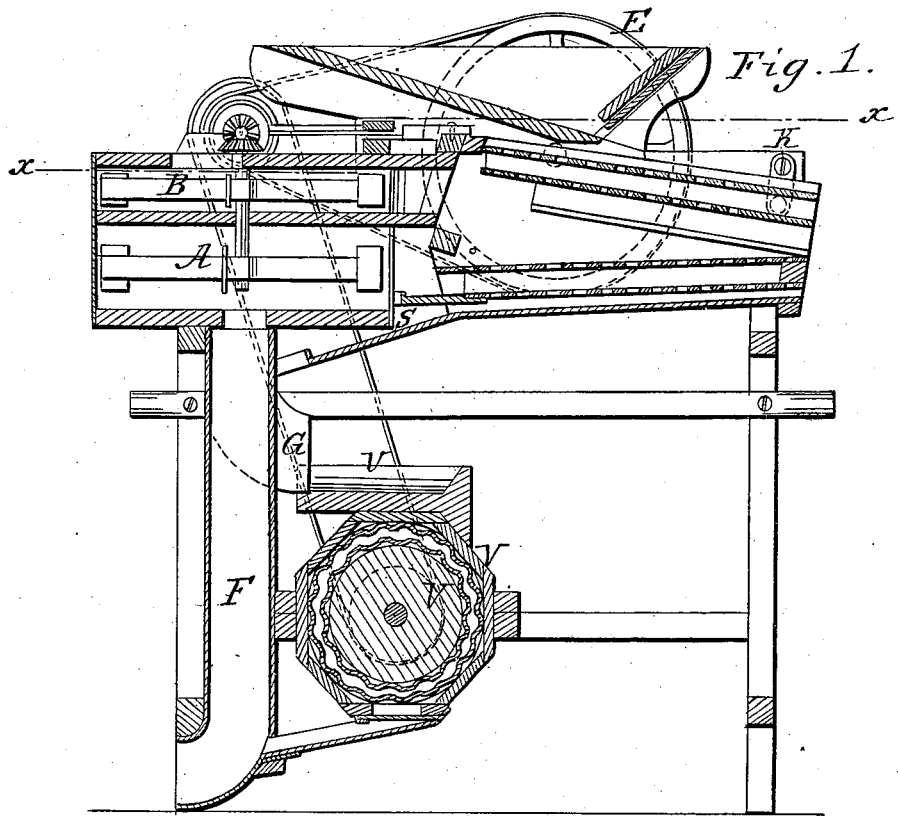
Figure 2:
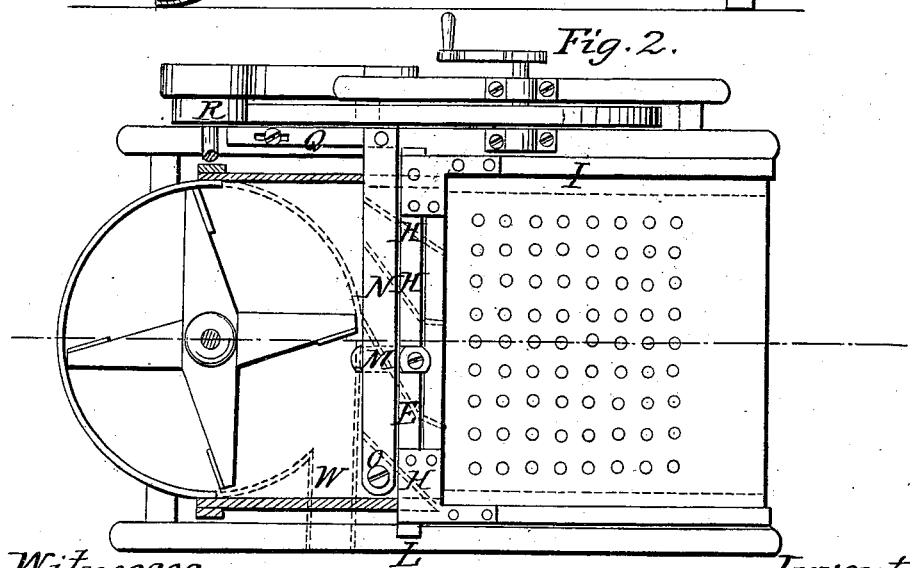

Figure 1 represents a longitudinal sectional elevation of my improved machine; and Figure 2 represents a horizontal section, taken on the line *x x* of fig. 1.

Similar letters of reference indicate corresponding parts.

I provide two fans, A and B, upon one vertical shaft, C, deriving motion from the horizontal shaft D, driven by a belt from the driving-wheel E.

The air is supplied to the upper fan through the top of the curb, and to the lower one through the spouts F G.

The blast from the upper fan is delivered to the upper screens as nearly in a horizontal plane as possible, to prevent the obstruction to the passage of the heavy grains, which occurs when the direction is more oblique, as in the fanning-mills of ordinary construction, while it floats the lighter materials off the screens to better advantage, according to my arrangement.

To prevent the blast being delivered upon one side of the screens, I provide the bent chutes H for distributing the blast evenly thereon.

For shaking the shoe I, which supports the screens, I support it at the outer end by the links K, and at the inner end by the bar L, the ends of which project over the top of the frame, and slide thereon.

The said bar L is connected by a link, M, to a lever, N, pivoted at O, and connected, at P, to a connecting-rod, Q, having a bent end, taking in a cam-groove in the driving-pulley R.

The grain, after passing over the sieves, is delivered, over the apron S, to the spout G, and thence to the hopper U of a scouring-device, V, and finally into the spout F, near the mouth.

An apron, S', is also connected to the lower sieve, for receiving any light or long grains that may find their way to the said screen, and carrying them off in a lateral direction.

The spouts F and G, into which the grain is delivered from the screens and scouring-device, being also the supply-passages for the fan A, will have a strong upward draught of air, which will take up any light substance in the grain which may have passed through the screens or scourer, and discharge it through the passage W.

For chaffing the grain only, the scouring-device may be disconnected, and the grain passed directly into the spout F; or the hopper of the scouring-device may be removed, and the grain delivered from the spout G; or the spout G may be reversed in its position, as shown by the dotted lines, which arrangement I prefer.

Having thus described my invention,

I claim as new, and desire to secure by Letters Patent—

1. The arrangement of the blowers, screens, and scouring-apparatus, substantially as specified.

2. The arrangement of the chutes H, fan B, and screens, substantially as specified.

3. The spouts F G, apron S, fan A, and scourer V, all substantially as specified.

WM. B. SMITH.

Witnesses:
 JOHN HAYS,
 E. LOYD.